May 15, 1928.
A. G. HAWKES ET AL
1,669,936
REAR BODY GRILLE
Filed Oct. 26, 1927
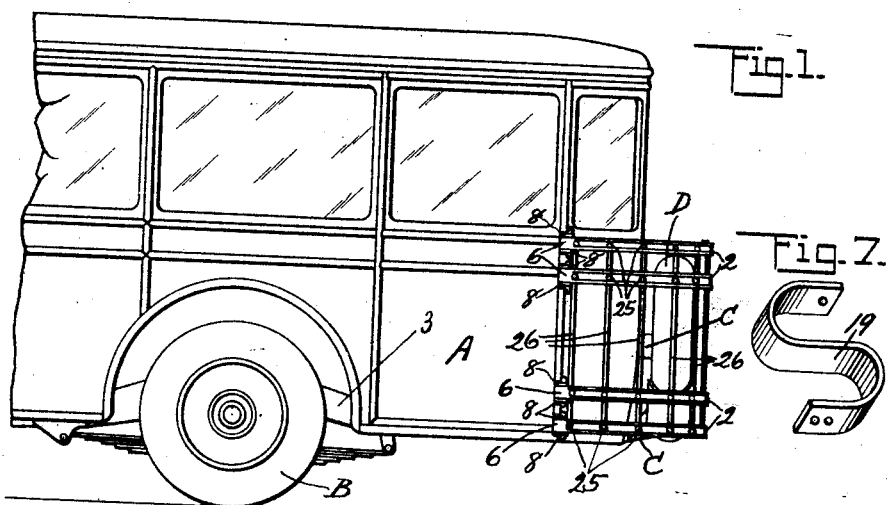
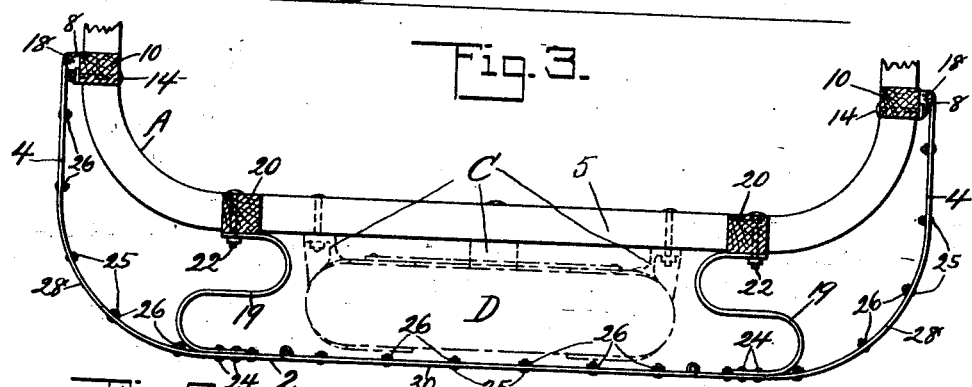
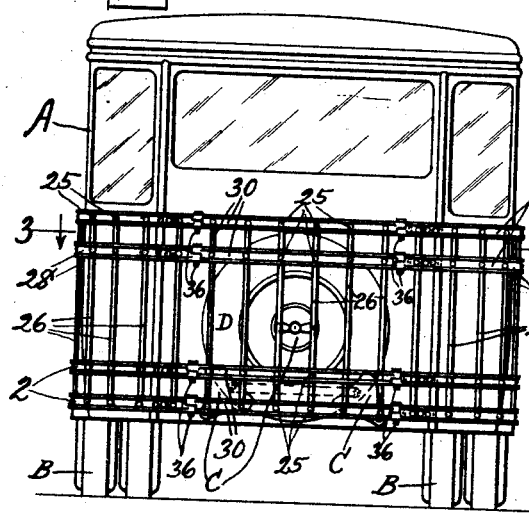
INVENTORS
Arthur G. Hawkes and
Frank A. Whitten
BY
ATTORNEY Patented May 15, 1928.

1,669,936

UNITED STATES PATENT OFFICE.

ARTHUR G. HAWKES AND FRANK A. WHITTEN, OF DETROIT, MICHIGAN, ASSIGNORS TO AMERICAN CAR AND FOUNDRY MOTORS COMPANY, OF NEW YORK, N. Y., A CORPORATION OF DELAWARE.

REAR-BODY GRILLE.

Application filed October 26, 1927. Serial No. 228,785.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a side elevation of the rear end of a motor vehicle showing the grille of the present invention attached thereto;

Fig. 2 is a view of the rear of a motor vehicle showing the invention attached thereto;

Fig. 3 is a view on the line 3—3 of Fig. 2;

Fig. 4 is a detail view of the attaching bracket;

Fig. 5 is a sectional view on the line 5—5 of Fig. 4;

Fig. 6 is a fragmentary view showing the joint or connection of adjacent transverse members; and Fig. 7 is a perspective view of one of the S-shaped brackets.

This invention relates generally to bumpers for motor vehicles, and particularly comprehends the provision of a rear body grille for a motor bus or the like.

One object of the present invention is to provide a rear body grille for motor vehicles formed entirely of spring metal.

Another object of the invention is the provision of a spring metal bumper of grille type which will provide a protection for the entire lower portion of the rear end of a motor bus or the like.

A further object of the invention is to provide a rear body grille for a motor vehicle having a hinged portion whereby to permit the removal or attachment of a spare tire to the vehicle body.

A still further object of the invention is to provide a rear body grille for motor vehicles which is attractive in appearance and which will function as a bumper and which is easy and inexpensive to manufacture and strong and durable in operation.

Other objects and advantages of this invention will be apparent from the following description taken in conjunction with the accompanying drawings in which a motor bus is shown having a body A supported on the wheels B and provided with belt rail 5, (see Fig. 3) and a chassis frame including the side members 3, (see Fig. 1).

Means indicated diagrammatically at C are provided for supporting a spare tire D at the rear end of the bus.

The grille of the present invention comprises upper and lower pairs of spaced transverse members 2 formed preferably of spring steel or other like resilient metal, the ends of which are bent to provide parallel attaching portions 4 extending partly along each side of the vehicle. The extreme ends of these transverse members are rolled to provide eyes 6 shown in Fig. 4 by which said members may be pivotally connected to brackets 8 secured to the body posts 10 adjacent the belt rail and chassis side frame members respectively. The construction of the brackets is clearly shown in Fig. 4, wherein it can be seen that the brackets are each formed with an attaching portion 12 taking the bolt 14, and with spaced apertured ears 16 between which the eye 6 is received; a pin 18 extending through the ears 16 and the eye 6 serving to pivotally connect the transverse member 2.

S-shaped spring brackets 19 are secured to the rear body posts 20 by bolts 22 or the like and are riveted to the transverse members 2 as shown at 24 to support the transverse members.

Extending between and secured to the transverse members 2 by rivets 25, are the upright or vertical members 26 which are also formed of spring steel or other like resilient metal.

From the description just above, it can be readily seen that a rear body grille is provided which is formed generally of spaced pairs of transverse members of spring steel or the like connected by a plurality of spring metal upright or vertical members.

The grille of this invention is formed with a hingedly mounted gate or a portion which is readily removable to permit the attachment and removal of the spare tire D, and to effect this construction, each transverse member 2 is preferably formed of end portions 28 and an intermediate portion 30 hingedly secured to the end portions as now described.

The inner end of each end portion 28 is reduced in width as clearly shown in Fig. 6, and is rolled to form an eye 32, and each end of each intermediate portion 30 is reduced and formed into an eye 34 which is complemental with the eye 32; the two eyes 32 and 34 being connected to form a hinge joint by means of a pin 36 having a head 37. The lower end of the pin 36 is apertured as shown at 38 to receive a suitable securing means such as a cotter pin or the like to prevent accidental displacement of the pin and the resulting breaking of the joint.

From the description just above, it is apparent that the rear body grille of the present invention is provided with a portion which is removable by taking out the pins 36 to permit access to the spare tire. It will further be apparent that this intermediate portion may be swung on the joints by removing the pins from one side of this portion, thus providing a swinging gate.

What is claimed is:

1. A rear body grille comprising spaced pairs of transverse members each formed of end sections and an intermediate section detachably connected to the end sections, attaching means formed at one end of each end section for securing the sections to the body, and vertical members connecting said end and intermediate sections and forming a gate between the connected end sections.

2. A rear body grille for motor vehicles comprising spaced pairs of transverse members each having end sections secured to the vehicle body and an intermediate section hingedly connected to the end sections, and vertical members between and connected to the end sections and intermediate sections, said intermediate sections and the upright members secured thereto forming a gate.

3. In a motor vehicle, body posts, end posts, a chassis frame and a belt rail, and a grille comprising oppositely arranged upper and lower pairs of transverse members extending partly along each side and partly across the rear of the vehicle, said pairs of transverse members being pivotally connected at one end to the body posts adjacent the belt rail and chassis frame respectively, spring brackets secured to the end posts and to the transverse members intermediate their ends for supporting said members, vertical members connecting said pairs of transverse members, and a gate interposed between the pairs of members and hingedly connected to each member of each pair.

4. In a motor vehicle, body posts, end posts, a chassis frame and a belt rail, the combination with a rear body grille comprising oppositely arranged spaced transverse members arranged adjacent the belt rail and chassis frame respectively and secured at one end to the body posts, brackets secured to the end posts and to the other ends of said transverse members to support the latter, vertical members connecting the transverse members, and a gate interposed between the oppositely arranged transverse members and hingedly connected thereto.

5. In a motor vehicle, body posts, and end posts, and a grille for the rear end of said vehicle comprising oppositely arranged spaced pairs of transverse members secured at one end to the body posts and extending partly across the rear of the vehicle, spring brackets secured to the end posts and said transverse members for supporting the latter, vertical members connecting said pairs of transverse members, and a gate interposed between said transverse members and pivotally connected thereto.

6. In a motor vehicle, body posts and end posts, and a grille for the rear end of said vehicle comprising oppositely arranged spaced pairs of transverse members extending partly across the rear and partly along the sides of the vehicle, brackets secured to the body posts for pivotally securing one end of each of said transverse members, spring brackets secured to the body posts and to said transverse members, for yieldingly supporting said members, vertical members connecting said pairs of transverse members, and a gate interposed between the free ends of said transverse members and hingedly connected thereto.

In witness whereof we have hereunto set our hands.

ARTHUR G. HAWKES.
FRANK A. WHITTEN.